(12) United States Patent
Ball, Jr. et al.

(10) Patent No.: US 6,948,509 B1
(45) Date of Patent: Sep. 27, 2005

(54) FLUID HYDRANT

(75) Inventors: William Thomas Ball, Jr., Colorado Springs, CO (US); Cody Wayne Jackosn, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 10/910,595

(22) Filed: Aug. 3, 2004

(51) Int. Cl.⁷ .............................................. F16K 31/14
(52) U.S. Cl. ........................ 137/1; 137/301; 137/368; 138/32
(58) Field of Search ............................... 137/60, 61, 62, 137/301, 302, 364, 368, 369, 370, 1, 15.02, 137/59; 138/28, 32

(56) References Cited

U.S. PATENT DOCUMENTS

| | | | |
|---|---|---|---|
| 21,858 A * | 10/1858 | Swan ........................... | 137/301 |
| 2,675,825 A * | 4/1954 | Hobbs et al. ................ | 137/301 |
| 2,688,976 A * | 9/1954 | Baker ........................... | 137/301 |
| 3,392,745 A * | 7/1968 | Noland ........................ | 137/301 |
| 3,407,837 A * | 10/1968 | Fulton et al. ............... | 137/301 |
| 3,480,027 A * | 11/1969 | Noland ........................ | 137/59 |
| 4,653,521 A | 3/1987 | Fillman | |
| 5,246,028 A | 9/1993 | Vandepas | |
| 5,261,441 A | 11/1993 | Anderson | |
| 5,701,925 A | 12/1997 | Mulligan et al. | |
| 6,047,723 A | 4/2000 | Hoeptner, III | |
| 6,085,776 A | 7/2000 | Hoeptner, III | |
| 6,135,359 A | 10/2000 | Almasy et al. | |
| 6,427,716 B1 | 8/2002 | Hoeptner, III | |

* cited by examiner

Primary Examiner—Kevin Lee
(74) Attorney, Agent, or Firm—Setter Ollila LLC

(57) ABSTRACT

A hydrant comprising a chamber forming a reservoir, an inlet configured to supply fluid to the hydrant and a sleeve configured to force static fluid out of an outlet, wherein a first portion of the chamber containing the reservoir is configured to be located in the ground below a frost line and a second portion of the chamber is configured to be located above the frost line, wherein the static fluid is forced to exit the outlet above the ground and residual fluid is trapped in the reservoir inhibiting freezing when the sleeve moves to a first position, and when in a second position the sleeve is configured to allow supply fluid to exit the outlet through the reservoir, thereby purging the reservoir of residual fluid.

26 Claims, 4 Drawing Sheets

US 6,948,509 B1

FLUID HYDRANT

BACKGROUND OF THE INVENTION

1. Field of the Invention

The invention is related to the field of fluid hydrants.

2. Statement of the Problem

Fluid hydrants are commonly used in conditions which demand sanitary performance when the operating temperature drops below freezing. Sanitary operation includes backflow protection, drain to ground and ground to drain restrictions and quick and easy evacuation of residual water. Past hydrant designs have focused on locating a reservoir below the freeze line into which residual flow of the supply fluid drains upon cessation of flow. The residual water is then purged from the reservoir using expensive and time consuming venturi check-valves (See U.S. Pat. No. 5,701,925) or complicated residual fluid diverter lines that add cost and complexity (See U.S. Pat. No. 6,427,716).

SUMMARY OF THE SOLUTION

The present invention helps solve the problems associated with unsanitary and below-freezing operation using a resilient sleeve system that allows for the removal of static fluid upon cessation of flow.

Some examples of the hydrant include a chamber forming a reservoir and a sleeve coupled to the chamber. The sleeve is configured to force static fluid out of an outlet when the sleeve moves into position.

In some examples, the sleeve is further configured to trap residual fluid in the reservoir and to allow supply fluid to flow through the outlet. The hydrant may also be configured wherein a first portion of the chamber containing the reservoir is to be located in the ground below a frost line and a second portion of the chamber is to be located above the ground. The above described locations allow the static fluid to be forced to flow through the outlet above the ground and residual fluid to be trapped in the reservoir inhibiting freezing when the sleeve moves to a first position. When the sleeve is in a second position it allows supply fluid to flow through the reservoir and the outlet, thereby purging the reservoir of residual fluid.

DETAILED DESCRIPTION OF THE INVENTION

FIGS. 1& 2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

EXAMPLE 1

Figure 1C:
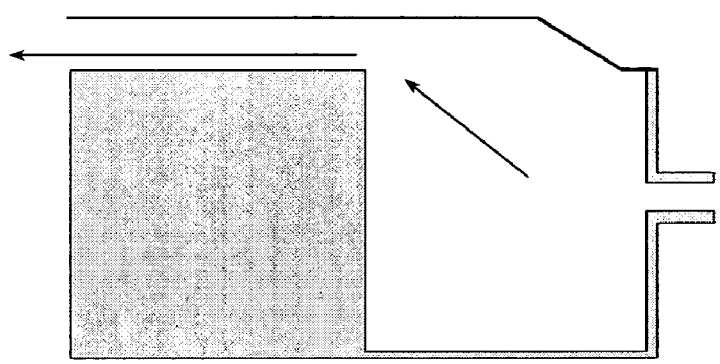
FIGS. 1A–C illustrate a hydrant in an example of the invention.
Figure 1B:
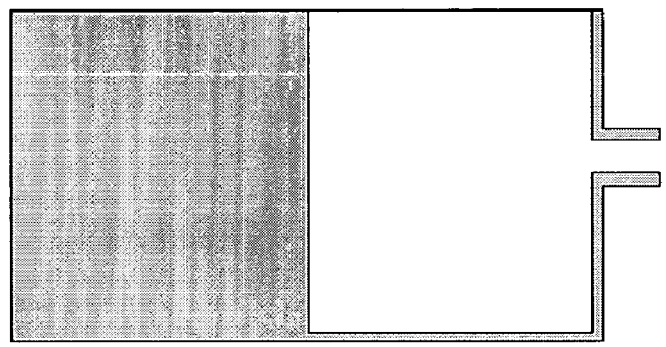
Figure 1A:
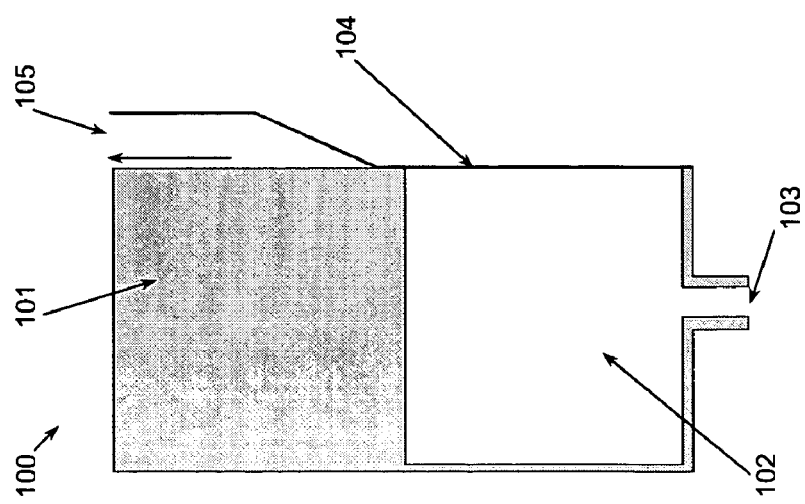

FIGS. 1A–C illustrate hydrant 100 in a first example of the invention. Hydrant 100 includes chamber 101, reservoir 102, inlet 103, sleeve 104 and outlet 105. Chamber 101 forms reservoir 102. Sleeve 104 is coupled to chamber 101. Sleeve 104 is composed of a resilient material that deforms when a force is applied to its surface. In the current example force is applied in the form of fluid pressure. When the fluid pressure is absent, the resilient nature of sleeve 104 acts to restore the original form of sleeve 104. In an alternative example, sleeve 104 may be composed of a rigid material with a resilient coupling to chamber 101. Other alternative examples may utilize combinations of the above examples.

FIG. 1A shows hydrant 100 in an eject position. In operation, flow is restricted to hydrant 100 allowing sleeve 104 to move against chamber 101. As sleeve 104 moves against chamber 101, static fluid located between chamber 101 and sleeve 104 is forced through outlet 105 while residual fluid remains in reservoir 102.

In FIG. 1B, hydrant 100 is in a no-flow position. Upon cessation of flow to hydrant 100, sleeve 104 is fully seated against chamber 101 closing off outlet 105. Residual fluid remains in reservoir 102 until flow is resumed. The reservoir is located below the freeze line, thereby allowing the residual fluid to remain in its fluid state.

When flow is initiated to hydrant 100, as shown in FIG. 1C, the fluid pressure forces sleeve 104 to move away from chamber 101. The movement of sleeve 101 opens outlet 105 allowing the supply fluid to enter reservoir 102. Upon entering reservoir 102 the supply fluid forces the residual fluid through outlet 105.

Advantageously, in some variations the fluid hydrant can be used to restrict freezing, while operating in a sanitary manner. This is achieved by purging the static fluid left in the hydrant and allowing the residual fluid to remain in the reservoir located below the freeze line when flow is stopped. When flow is initiated, the residual fluid located in the reservoir is forced through the outlet by the incoming supply fluid. The evacuation of the residual fluid prevents contamination that would otherwise occur if the residual fluid is left in the reservoir for prolonged periods of time.

EXAMPLE 2

Figure 2A:
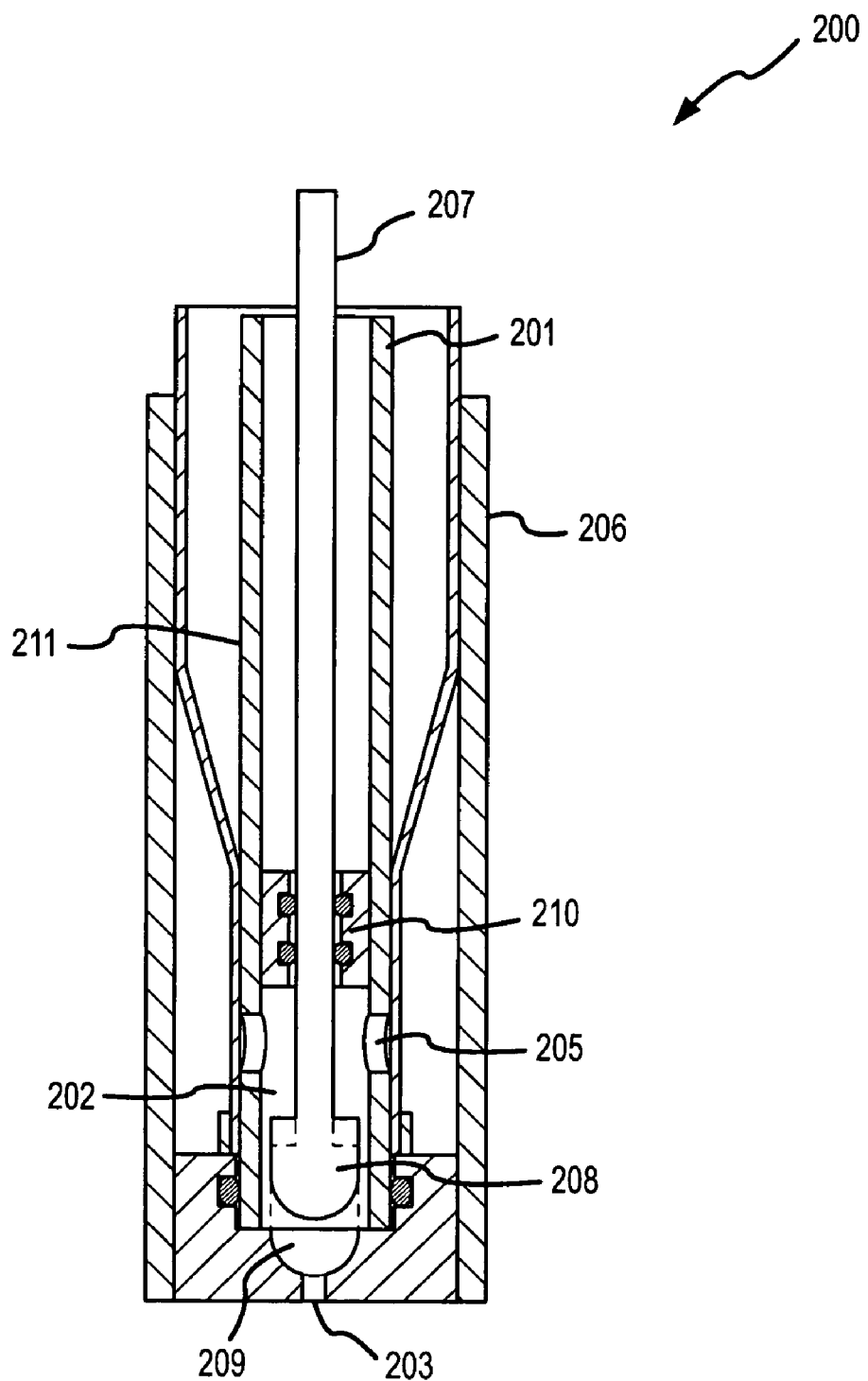
FIGS. 2A–C illustrate a hydrant in an example of the invention.
Figure 2B:
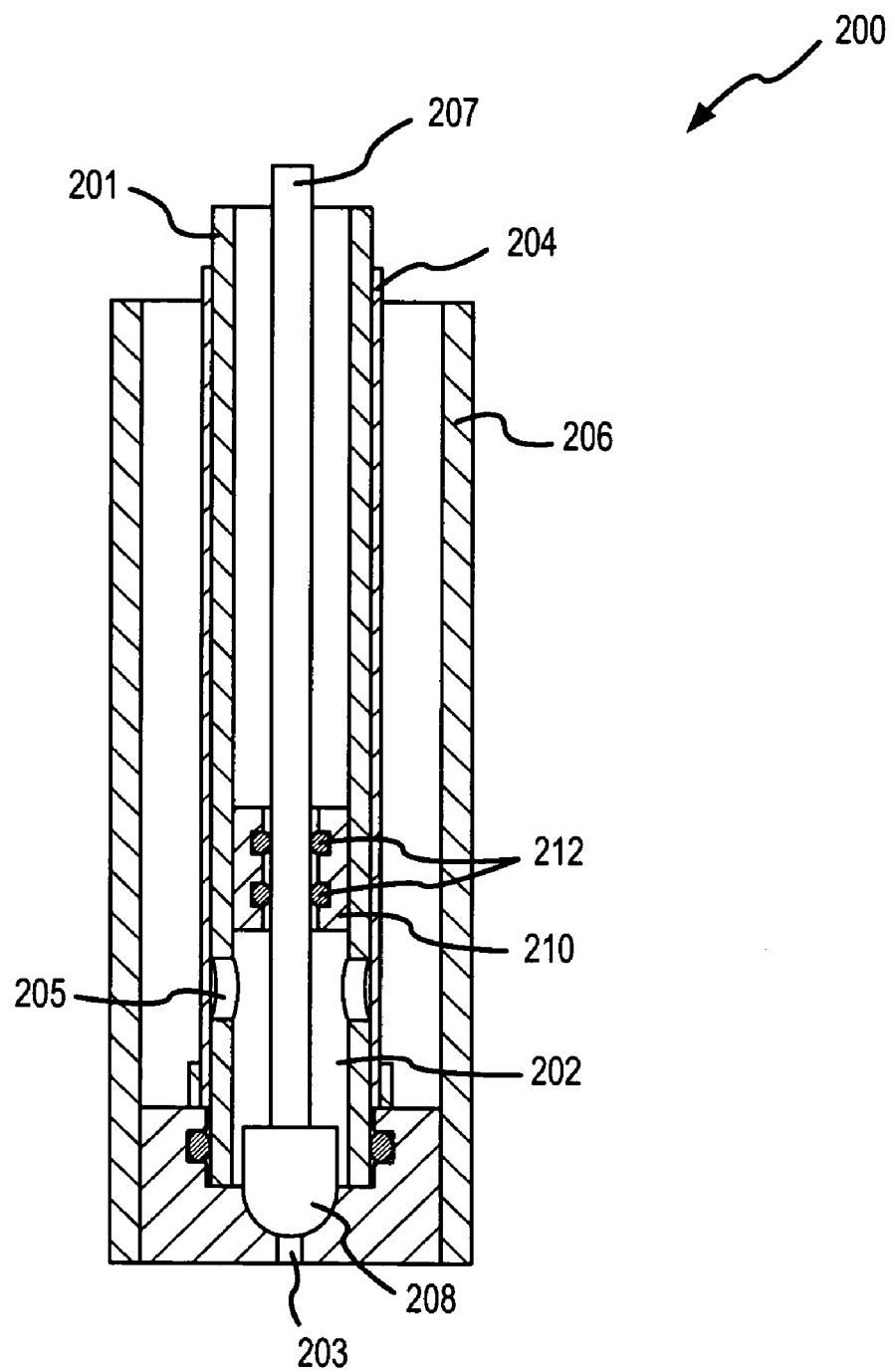
Figure 2C:
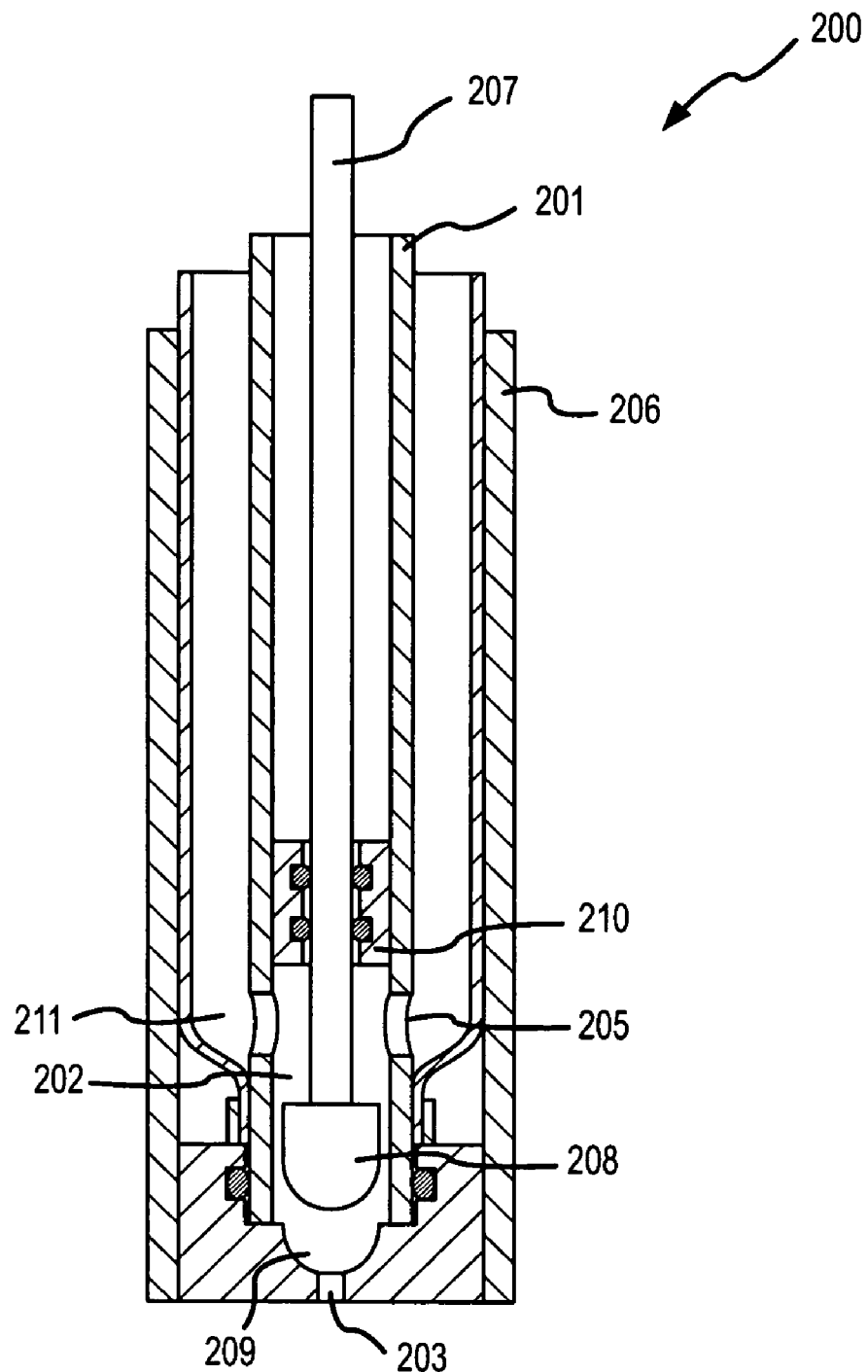

FIGS. 2A–C illustrates hydrant 200 in a second example of the invention. Hydrant 200 comprises housing 206 which consists of water inlet 203 and valve seat 209. Contained in housing 206 is chamber 201, which together form reservoir 202 and conduit 211. Situated inside chamber 201 is operating shaft 207 having plunger 208 coupled to its end.

Operating shaft 207 controls the flow of supply fluid by moving plunger 208 into valve seat 209, thereby closing inlet 203 or alternatively retracting plunger 208 from valve seat 209, thereby opening inlet 203. Rod guide 210 and o-rings 212 allow operating shaft 207 to move inside chamber 201 while sealing off reservoir 202 from the upper portion of chamber 201.

Integrated into chamber 201 is outlet 205. Depending on the operational step, outlet 205 may be sealed off by sleeve 204. Sleeve 204 is coupled to chamber 201 or as an alternative may be coupled to housing 206. Sleeve 204 is composed of a resilient material that deforms when a force is applied to its surface. In the current example force is applied in the form of fluid pressure. When the fluid pressure is absent, the resilient nature of the sleeve acts to restore the original form of the sleeve. In an alternative example, the sleeve may be composed of a rigid material with a resilient coupling to the chamber. Other alternative examples may utilize combinations of the above examples.

FIG. 2A shows hydrant 200 in an eject position. In operation, an operator, either manually or remotely, actuates operating shaft 207 causing it to lower plunger 208 into valve seat 209. The cessation of flow causes sleeve 204 to move toward chamber 201, forcing the static water trapped in conduit 211 out of hydrant 200.

In FIG. 2B, hydrant 200 is in a no-flow position. Upon cessation of flow to hydrant 200, sleeve 204 is fully seated against chamber 201 closing off outlet 205. Residual fluid remains trapped in reservoir 202 until flow is resumed. The reservoir is located below the freeze line, thereby allowing the residual fluid to remain in its fluid state.

When flow is resumed, as shown in FIG. 2C, hydrant 200 the operator, either manually or remotely, actuates operating shaft 207 causing plunger 208 to retract from valve seat 209 thus opening up inlet 203. The incoming supply fluid enters reservoir 202 forcing the residual fluid through outlet 205. The fluid flowing through outlet 205 forces sleeve 204 away from outlet 205 and chamber 201, allowing the fluid to flow into conduit 211 and exit hydrant 200.

In the context of the invention described in the previous examples, the supply fluid is fluid that enters reservoir the 101/201 from inlet 103/203. Fluid that remains in reservoir 101/201 when inlet 103/203 and outlet 105/205 are closed is termed residual fluid. The fluid that is forced out of hydrant 100/200 by sleeve 104/204 is referred to as static fluid.

What is claimed is:

1. A hydrant comprising:
a chamber forming a reservoir;
an inlet configured to supply fluid to the hydrant; and
a sleeve configured to force static fluid out of an outlet.

2. The hydrant of claim 1 wherein the sleeve is further configured to trap residual fluid in the reservoir.

3. The hydrant of claim 1 wherein the sleeve is further configured to allow supply fluid to flow through the outlet.

4. The hydrant of claim 1 wherein a first portion of the chamber containing the reservoir is configured to be located in the ground below a frost line and a second portion of the chamber is configured to be located above the frost line, wherein the static fluid is forced to exit the outlet above the ground and residual fluid is trapped in the reservoir inhibiting freezing when the sleeve moves to a first position, and when in a second position the sleeve is configured to allow supply fluid to exit the outlet through the reservoir, thereby purging the reservoir of residual fluid.

5. The hydrant of claim 1 further comprising an operating shaft.

6. The hydrant of claim 5 wherein the operating shaft is configured to control the flow of supply fluid into the reservoir.

7. The hydrant of claim 1 wherein the sleeve is formed out of a resilient material.

8. The hydrant of claim 1 wherein the chamber is contained within a housing.

9. The hydrant of claim 8 wherein the area between the housing and the chamber forms a conduit.

10. The hydrant of claim 1 wherein the outlet is integral to the chamber.

11. The hydrant of claim 1 further comprising a conduit coupled to the outlet.

12. The hydrant of claim 1 wherein the reservoir is configured for location below the frost line thereby inhibiting freezing of the residual fluid.

13. The hydrant of claim 1 wherein the outlet comprises at least two openings.

14. A method of operating a hydrant comprising:
restricting a supply fluid from the hydrant; and
ejecting a static fluid from an outlet, wherein the static fluid is ejected due to movement of a sleeve.

15. The method of claim 14 further comprising trapping residual fluid in a reservoir, wherein the residual fluid is trapped in the reservoir due to movement of the sleeve.

16. The method of claim 14 further comprising permitting supply fluid to flow through an outlet.

17. The method of claim 14 further comprising:
locating a first portion of a chamber containing a reservoir in the ground below a frost line;
locating a second portion of the chamber above the frost line; and
wherein the static fluid is able to exit the chamber above the ground and residual fluid is able to remain in the reservoir when the sleeve moves to a first position thereby inhibiting freezing of the residual fluid, and when in a second position the sleeve is configured to allow supply fluid to flow through the reservoir and an outlet thereby purging the reservoir of residual fluid and inhibiting contamination.

18. The method of claim 14 further comprising providing an operating shaft.

19. The method of claim 18 further comprising providing an operating shaft operable to control the flow of the supply fluid into a reservoir.

20. The method of claim 14 wherein the sleeve is formed out of a resilient material.

21. The method of claim 14 further comprising providing a chamber within a housing, wherein said chamber forms the reservoir.

22. The method of claim 14 wherein the area between the housing and the chamber forms a conduit.

23. The method of claim 21 wherein the outlet is integral to the chamber.

24. The method of claim 14 wherein a conduit is coupled to the outlet.

25. The method of claim 14 further comprising configuring the reservoir for location below the frost line thereby inhibiting freezing of the residual fluid.

26. The method of claim 14 wherein the outlet comprises at least two openings.

* * * * *